US006895237B1

(12) United States Patent
Scott

(10) Patent No.: US 6,895,237 B1
(45) Date of Patent: May 17, 2005

(54) METHOD AND APPARATUS FOR RESPONDING TO AN INCOMING CALL

(75) Inventor: Clifton E. Scott, San Diego, CA (US)

(73) Assignee: Qualcomm, Incorporated, San Diego, CA (US)

( * ) Notice: Subject to any disclaimer, the term of this patent is extended or adjusted under 35 U.S.C. 154(b) by 0 days.

(21) Appl. No.: 09/490,557

(22) Filed: Jan. 25, 2000

(51) Int. Cl.⁷ .............................................. H04M 3/42
(52) U.S. Cl. ............................... 455/414.1; 455/412.1; 455/412.2; 455/413; 455/415; 455/466; 455/445; 379/201.07; 379/211.01
(58) Field of Search .......................... 455/414.1, 412.1, 455/73, 415, 717, 445, 466, 412.2, 413, 417, 412, 414, 422, 552; 379/201.07, 211.01

(56) References Cited

U.S. PATENT DOCUMENTS

| | | | | |
|---|---|---|---|---|
| 6,006,087 A | * | 12/1999 | Amin | 455/413 |
| 6,009,159 A | * | 12/1999 | Baiyor et al. | 379/196 |
| 6,014,559 A | * | 1/2000 | Amin | 455/413 |
| 6,134,450 A | * | 10/2000 | Nordeman | 455/507 |
| 6,138,008 A | * | 10/2000 | Dunn et al. | 455/414 |
| 6,157,831 A | * | 12/2000 | Lamb | 455/417 |
| 6,188,888 B1 | * | 2/2001 | Bartle et al. | 455/417 |
| 6,389,276 B1 | * | 5/2002 | Brilla et al. | 379/68 |
| 6,405,033 B1 | * | 6/2002 | Kennedy, III et al. | 455/404 |
| 6,630,883 B1 | * | 10/2003 | Amin et al. | 340/7.29 |
| 6,631,182 B1 | * | 10/2003 | Schwab et al. | 379/88.19 |
| 6,704,565 B1 | * | 3/2004 | Parsons et al. | 455/414.1 |
| 6,718,178 B1 | * | 4/2004 | Sladek et al. | 455/466 |

* cited by examiner

*Primary Examiner*—Marceau Milord
(74) *Attorney, Agent, or Firm*—Philip R. Wadsworth; Charles D. Brown; Nicholas J. Pauley

(57) ABSTRACT

The present invention is directed to a system and method for allowing a user to conveniently receive an incoming wireless telephone call. After the phone rings once, the receiving party checks his caller ID and realizes he wants to take the call but does not want to disrupt his/her current surroundings. The user receiving the call presses a pre-programmed soft key on the phone. The phone plays a prerecorded message audible only to the calling party. While the message is played, the user has the opportunity to exit a crowded public area or meeting place. The prerecorded message is stored in memory on the phone itself in one embodiment of the invention. In another embodiment of the invention, the memo is stored externally from the phone, within the network infrastructure equipment or perhaps in yet another third party location accessible in real (or near real) time.

5 Claims, 2 Drawing Sheets

METHOD AND APPARATUS FOR RESPONDING TO AN INCOMING CALL

FIELD OF THE INVENTION

The present invention pertains generally to the field of wireless communications, and more specifically to responding to a received call via a wireless communication device.

BACKGROUND

The field of wireless communications has many applications including, e.g., cordless telephones, paging, cellular, wireless local loops, and satellite communication systems. A particularly important application is cellular telephone systems (also including Personal Communications Services (PCS) for mobile subscribers.

Wireless communication devices, such as cellular telephones, are widely used as a replacement for conventional telephone systems. Hereinafter the term cellular will be used to refer to any wireless communication device. In addition to functioning as a replacement for a conventional telephone, wireless communication devices offer the advantage of portability, thus enabling the user to establish a wireless communication link between virtually any two locations on Earth.

In addition to conventional voice communication, wireless communication devices also provide features such as voicemail, voice messaging, and automatic callback notification. Callback notification allows a caller to automatically transmit his telephone number to simplify the process of returning a call. For example, the user of a wireless telephone may place a call (the calling party) that is not received by the intended recipient. A message may be left for the intended recipient (the called party) and include a "callback number," which corresponds to the caller's mobile identification number. The message recipient may readily establish a communication link with the wireless communication device using the callback number.

Other features, such as three-way calling, are also readily implemented using the conventional communication device. The user of the wireless communication device may establish a first communication link by selecting a stored telephone number from a telephone book storage area within the wireless communication device. When the first communication link is established, the user establishes the second communication link by manually entering a second destination telephone number or by selecting a second destination telephone number from the telephone book storage area.

An additional group of features include voicemail services. Typical services provide for the automatic unattended answering of a call after a predetermined number of rings. Traditional voicemail services fall short in some instances. For example, people in public places such as movie theaters, restaurants and meetings often are interrupted by incoming telephone calls. There are occasions when the receiving person desires to answer the call but is unable to immediately do so. What is needed is a mechanism to allow the receiving party to respond to the incoming call with a minimal amount of disruption to public proceedings around him or her.

SUMMARY OF THE INVENTION

The preferred embodiment of the invention is directed to a system and method for allowing a user to conveniently receive an incoming wireless telephone call. After the phone rings (or otherwise alerts the calling party by either buzzing, vibrating or flashing) once, the receiving party checks his caller ID and realizes he wants to take the call but does not want to disrupt his/her current surroundings. The user receiving the call presses a pre-programmed soft key on the phone. The phone plays a prerecorded message audible only to the calling party. While the message is played, the user has the opportunity to exit a crowded public area or meeting place. The prerecorded message is stored in memory on the phone itself in one embodiment of the invention. In another embodiment of the invention, the memo is stored externally from the phone, within the network infrastructure equipment or perhaps in yet another third party location accessible in real (or near real) time.

Any number of prerecorded or synthesized voice messages may be stored in on-phone memory. The number of messages may be constrained by the size of memory, however. The messages may be a mixture of predefined messages or user-created messages. The messages each may be associated with a different calling party.

The device may further include a receiver for receiving an incoming signal, a transmitter for transmitting an outgoing signal, memory for storing data, an input device, and a processor for accepting input and operably connected to memory for controlling the transmitter and the receiver while accepting a signal from the input device after receiving an incoming call and placing the wireless communication device into a delay mode.

DETAILED DESCRIPTION OF THE PREFERRED EMBODIMENTS

An illustrative implementation of a microprocessor-based telephone system in accordance with the invention is presented here. The illustration uses an automobile cellular phone as an example, but it will be understood by those skilled in the art that the invention can be implemented in virtually any telecommunications system.

Figure 1:
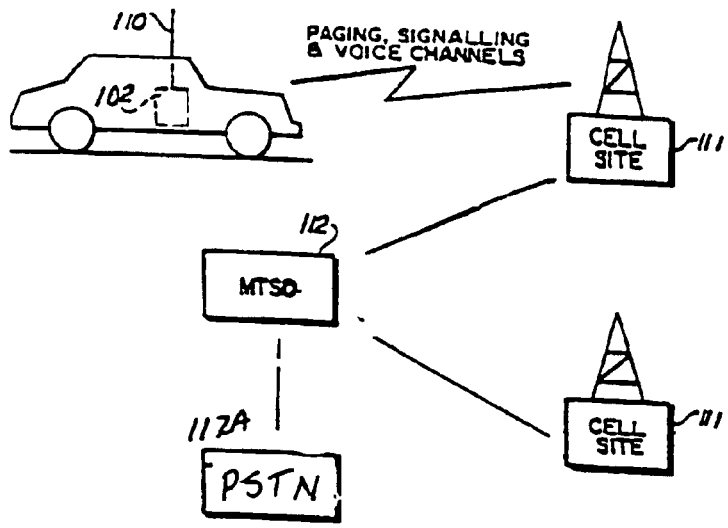
FIG. 1 illustrates a radiotelephone system in which an embodiment of the current invention operates.

FIG. 1 illustrates a typical wireless radiotelephone system 100 including a mobile station 102 having a unique mobile identification number (MID) stored in a suitable location such as FLASH memory or in an electrically eraseable programmable read-only memory (EEPROM, not shown). Telephone units of this kind are well known in the art and are described here only in sufficient detail to aid understanding the invention. Mobile station 102 communicates with cell site 111 through antenna 110 via paging, signaling and voice/data channels. Cell site 111 (two are illustrated) communicates to Mobile Terminal Switching Office (MTSO) 112 via a radiolink or landline and then to the Public Switched Telephone Network (PSTN) 112A via a high capacity landline or similar connection.

Such mobile stations are typically hand held devices but historically have been associated with an automobile. However, the embodiments described within refer to any wireless device, whether or not handheld, mobile, fixed in location or any combination thereof.

Figure 2:
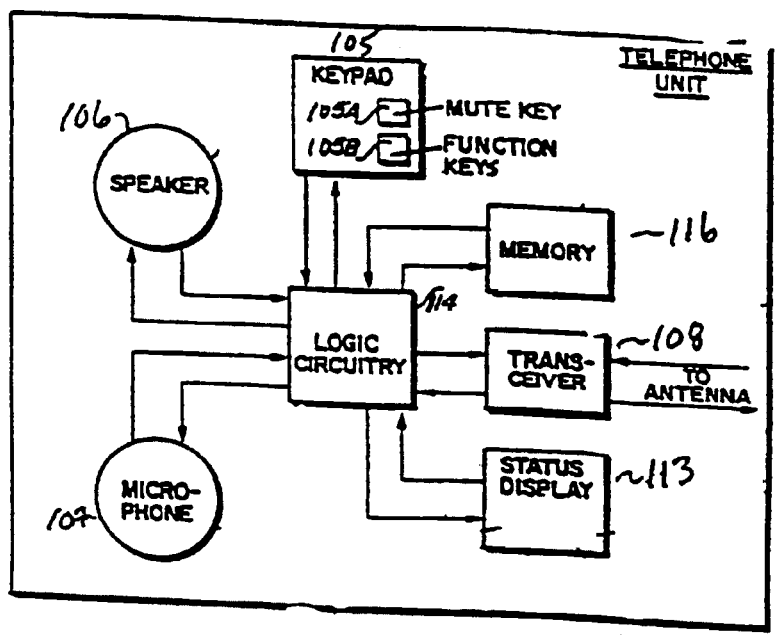
FIG. 2 illustrates a radiotelephone unit in which an embodiment of the current invention operates.

Referring now to FIG. 2, the telephone unit 102 includes a handset 104 having a keypad 105; equivalently, the keypad 105 could be located separately from the handset. Also included in the telephone unit 102 are a speaker 106 and a microphone 107, shown as being mounted within the handset 104 but either or both of which could equivalently be mounted apart from the handset, either separately (e.g., in a telephone operator's headset or in wall mountings), or approximately together (e.g., in a wakie-talkie or speakerphone configuration). It will be apparent to those of ordinary skill that if the keypad 105, the speaker 106, and the microphone 107 are all located apart from the handset 104, the handset can be dispensed with.

A preferred embodiment of the invention typically operates in the following fashion. A user receives a call on his cellular phone while in the middle of a meeting. The phone alerts the user, the receiving party checks his caller ID and realizes he wants to take the call but does not want to disrupt the meeting. The user receiving the call presses a preprogrammed soft key on the phone. The phone plays a prerecorded message audible only to the calling party such as, for example, "Hi, this is Joe. I'm in a meeting. Please wait a moment while I step outside to take your call." After exiting the meeting, the user presses the talk button (in this scenario) and has a conversation with the calling party. Should the user be unable to step out of the meeting, the depressing of another soft key or series of soft keys would send the calling party either into voicemail or to another message indicating the user is unable to take the call at the present time.

The prerecorded message is stored in memory on the phone itself in one embodiment of the invention. In another embodiment of the invention, the memo is stored externally from the phone, within the network infrastructure equipment or perhaps in yet another third party location accessible in real (or near real) time.

Any number of prerecorded or synthesized voice messages may be stored in on-phone memory. The number of messages may be constrained by the size of memory, however. The messages may be a mixture of predefined messages or user-created messages. The messages each may be associated with a different calling party.

The phone unit is optionally programmed to recognize a specific calling number and associate an appropriate prerecorded response with that number. For example, when a call comes in from the user's supervisor, the prerecorded message might be "I'm in a meeting and will send you the minutes as soon as it is over." Of course, the user could additionally choose to press the predefined soft key if optionally implemented, which would trigger a message to the calling party to wait momentarily while the user stepped outside to take the call.

In a preferred embodiment, the phone recognizes the calling party based on Caller ID information transmitted to the cell phone. The voice memo response associated through a link stored in user memory with the Caller ID information is then transmitted. However, the information used to associate to a particular voice memo need not be Caller ID. It may be some other type of identifying information. One such type of identifying information, for example, is a predefined keystroke sequence entered at the appropriate time. Such an appropriate time may be while the call is in process or before the call has been connected.

Should the user be delayed in exiting the room in this scenario, a second press of the soft key would repeat the message and extend the response time before the call is automatically rerouted. The phone is considered to be off-hook, but the call is muted to prohibit the calling party from audibly observing the surroundings of the called user party.

Additionally, any reference to a soft key is also intended to be equivalent to a smart key that is programmable to represent a predefined function, a menu selected option from a display screen, a selectable icon or any other type of input.

Figure 3:
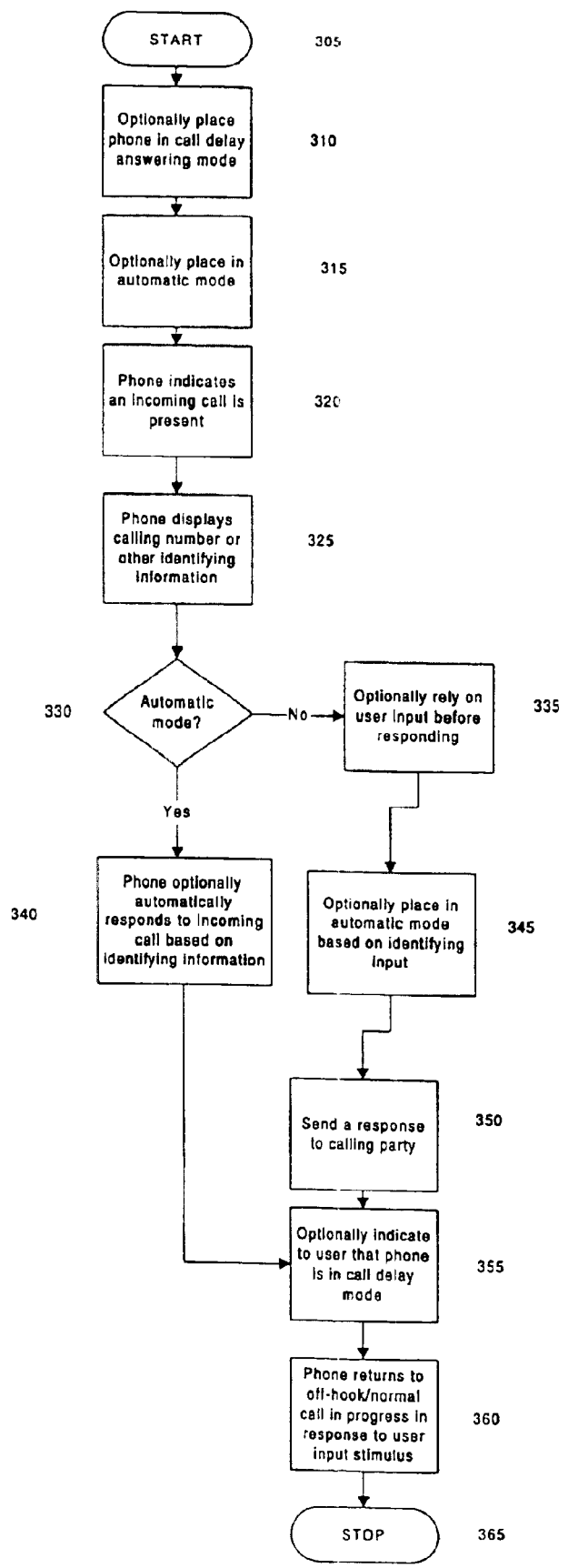
FIG. 3 illustrates in flowchart form a method of operation of an embodiment of the present invention.

FIG. 3 illustrates a method of operation of a preferred embodiment of the present invention. The methodology begins in block 305 labeled Start. In block 310, the mobile phone is optionally placed in an automatic call delay answering mode. In step 315, the phone is optionally placed in automatic mode. This may be done manually or by automatic operation detailed below. In block 320, the phone indicates the reception of an incoming call. In response to the incoming call notification, the phone displays the calling phone number and/or other identifying information such as name in step 325. In step 330 flow control is determined by automatic mode status. In step 340, the phone, in one embodiment of the invention, may optionally automatically respond to an incoming phone call based on the identifying information. In another embodiment of the invention, the phone may also rely upon user input before responding in step 335.

Step 345 further optionally includes the capability of automatically placing the phone in call delay answering mode based on the information received identifying the calling party. Upon termination of the call at the end of the conversation, the phone is then returned to the previous state. This optional feature allows for another level of call screening.

In step 350, the phone also sends a response audible to the calling party based on either the user input or automatically according to the variable setup configuration of the phone. Such a response is the aforementioned prerecorded message. An exemplary user input is the depression of an appropriate key or the movement of a phone including the opening of a clamshell type phone. Step 350 may optionally be repeated to allow the user more time to respond to the calling party. The response in step 350 may be a single constant response, or may rely upon user input. This response may be dependent upon the identifying information or may be independent of the information. For example, when in automatic call delay answering mode, all callers may get the single response. Optionally, a unique response may be tailored to separate calling parties.

In step 355, an indication is optionally given that the phone is in automatic call delay answering mode. Such an indication is indicated in a preferred embodiment by the presence of visual alphanumeric text on the display. However, such an indication need not be on the display screen, need not be alphanumeric and furthermore, need not even be visual. It may be in the form of a display light, a blinking key or even an audible, vibrating or other (human or machine) sensed indication.

The phone returns to off hook—call connected condition upon receiving an input in step 360. In the preferred embodiment, this input is the user pressing the "talk" key in step 365.

Should the phone not receive a predefined input from the user, after a predetermined delay the calling party is optionally routed into voicemail or the call is terminated, depending upon the predetermined scenario.

The optional automatic operation discussed with reference to step 345 is based on data information stored in a Personal Information Manager (PIM). Such a PIM may be of the form of a software program resident on a Personal Computer or may take the form of a built in program found in a Personal Digital Assistant (PDA). PIMs and PDAs typically are used as organizational tools and typically contain scheduling and address (contact) information. PIM/PDAs are well known in the art and need not be discussed in further detail here. Such a PIM/PDA may be integral to the phone or may be operationally connected with the phone in a number of ways, including direct physical connection, wireless radio frequency (RF) connection or infrared (IR) connection.

The user's phone may be synchronized with a PIM/PDA either continuously or on a periodic basis. For example, a user will enter his contact directory portions of his/her schedule from the PIM/PDA into the phone. Based on the schedule, the phone recognizes when the user is in a meeting and can automatically enable the call delay answering mode. Further, a calling party can be identified, compared to an entry in the contact database, associated with an appropriate response thus allowing the user to appropriately respond.

It is to be understood that even though various embodiments and advantages of the present invention have been set forth in the foregoing description, the above description is illustrative only, and changes may be made in detail, yet remain within the broad principles of the invention. For example, it should be noted that the claimed invention applies to any device that can update a phonebook directory and is not limited to wireless communication devices Therefore, the present invention is to be limited only by the appended claims.

What is claimed is:

1. A method of responding to a call in a wireless communication device comprising:
   accepting an incoming call;
   displaying the source of the call;
   detecting a first input;
   responding to the first input by providing a prerecorded message in response to the incoming call; and
   accepting a second input to terminate the prerecorded message and answer the call.

2. The method of claim 1 wherein providing a prerecorded message in response to the incoming call further comprises accepting a third input to repeat the prerecorded message.

3. The method of claim 1 wherein providing the prerecorded message further comprises accessing the prerecorded message from within the wireless communication device.

4. The method of claim 1 wherein providing a prerecorded message in response to the incoming call further comprises selecting the prerecorded message from a plurality of prerecorded messages dependant on the source of the call.

5. The method of claim 1 wherein displaying the source of the call further comprises:
   using Caller ID information to determine the source of the call; and displaying information related to the Caller ID information.

* * * * *